(12) United States Patent
Balk et al.

(10) Patent No.: US 8,834,119 B2
(45) Date of Patent: Sep. 16, 2014

(54) DEVICE WITH COUNTER-ROTATING PROPELLERS HAVING A PROPELLER PITCH ALTERING MEANS

(75) Inventors: Wouter Balk, Melun (FR); Francois Gallet, Paris (FR)

(73) Assignee: SNECMA, Paris (FR)

( * ) Notice: Subject to any disclaimer, the term of this patent is extended or adjusted under 35 U.S.C. 154(b) by 590 days.

(21) Appl. No.: 13/203,154

(22) PCT Filed: Feb. 25, 2010

(86) PCT No.: PCT/EP2010/052421
§ 371 (c)(1),
(2), (4) Date: Aug. 24, 2011

(87) PCT Pub. No.: WO2010/097440
PCT Pub. Date: Sep. 2, 2010

(65) Prior Publication Data
US 2011/0305575 A1 Dec. 15, 2011

(30) Foreign Application Priority Data
Feb. 27, 2009 (FR) ...................... 09 51259

(51) Int. Cl.
| F01D 25/00 | (2006.01) |
| B64C 11/48 | (2006.01) |
| F01D 7/00 | (2006.01) |
| B63H 5/10 | (2006.01) |
| B64D 35/06 | (2006.01) |
| B63H 3/08 | (2006.01) |
| B64C 11/30 | (2006.01) |
| B63H 3/06 | (2006.01) |
| B64D 27/00 | (2006.01) |

(52) U.S. Cl.
CPC *B63H 5/10* (2013.01); *B64C 11/48* (2013.01); *Y02T 50/66* (2013.01); *F01D 7/00* (2013.01); *B64D 2027/005* (2013.01); *B64D 35/06* (2013.01); *B63H 3/082* (2013.01); *B64C 11/306* (2013.01); *B63H 3/06* (2013.01); *F05D 2220/324* (2013.01)

USPC .......................................... 416/160; 416/129

(58) Field of Classification Search
CPC .... B64C 11/30; B64C 11/306; B64C 11/308; B64C 11/48; B64C 13/30; F05D 2220/324; F05D 2260/4031; F05D 2260/40311
USPC ................................... 416/160, 129
See application file for complete search history.

(56) References Cited

U.S. PATENT DOCUMENTS 3,163,231 A 12/1964 Barnes et al.
3,904,315 A 9/1975 Schwartz
(Continued)

FOREIGN PATENT DOCUMENTS

DE 39 05 282 C1 5/1990
EP 1 953 084 A1 8/2008
GB 2 209 371 A 5/1989

OTHER PUBLICATIONS

U.S. Appl. No. 13/322,523, filed Nov. 25, 2011, Balk, et al.

(Continued)

*Primary Examiner* — Edward Look
*Assistant Examiner* — Jeffrey A Brownson
(74) *Attorney, Agent, or Firm* — Oblon, Spivak, McClelland, Maier & Neustadt, L.L.P.

(57) ABSTRACT

A device including a pair of counter rotating propellers with variable pitch which may be modified by an actuator located in a central cavity of the shafts. A system for transporting energy to the actuator includes a conduit passing into a static case in proximity to an epicycloidal gear train, and then control conduits leading to the actuator and crossing the planet carrier of an epicycloidal gear train. The junction is affected by a dynamic joint with a collector. This transport path avoids a high temperature turbine.

5 Claims, 4 Drawing Sheets

(56) References Cited

U.S. PATENT DOCUMENTS 4,657,484 A 4/1987 Wakeman et al.
4,772,181 A 9/1988 Poucher
2008/0179455 A1 7/2008 Gallet
2010/0104438 A1 4/2010 Charier et al.

OTHER PUBLICATIONS

U.S. Appl. No. 13/375,041, filed Nov. 29, 2011, Balk, et al.

DEVICE WITH COUNTER-ROTATING PROPELLERS HAVING A PROPELLER PITCH ALTERING MEANS

The subject of the invention is a device with counter-rotating propellers having a means for altering the pitch of the propellers, supplied with energy, most often from oil which may be pressurized, the means then being a hydraulic actuator.

Devices with counter-rotating propellers are already known in several aircraft versions and are appreciated since they allow fuel savings. Some comprise propellers with a variable pitch and means for altering the pitch. One difficulty then consists in bringing the energy to the actuators in a suitable way, since the unoccupied space is not very large and since the device comprises assemblies of parts rotating at several different speeds, which have to be crossed. This problem remains present with transmissions appearing as an epicycloidal gear train, with which the energy of a turbine may be distributed among both driving shafts of the propellers while ensuring counter-rotations in the intended speed ratio. The actuator may be placed in proximity to the propellers, in a cavity surrounded by two driving shafts. It is tempting to have the power lines pass into this central cavity of the device, along the driving shaft, through the epcicyloidal gear train and along another hollow shaft, bound to the low pressure turbine and supporting the epicycloidal gear train by driving it; and to extend this line, located in the axis of rotation of the device, with a fixed and bent line assuming a radial direction through the turbine. This device would be particularly simple, but it was seen that having the oil pass through the very hot turbine was capable of producing coking which is detrimental to the performance of the actuator.

Therefore another means for supplying energy to the actuator is recommended here, which is without this drawback. In a general form, the invention relates to a device with counter-rotating propellers, comprising a means for altering the pitch of the propellers and an epicycloidal gear train transmission between a driving turbine and the propellers, the pitch altering means comprising an actuator supplied with energy and housed in a cavity surrounded by concentric shafts connecting the epicycloidal gear train to the propellers, as well as a system for conveying energy from a stator to the actuator, characterized in that the transport system comprises a power supply conduit crossing a fixed case of the stator, the fixed case extending between the turbine and the epicycloidal gear train, and then a dynamic joint between one end of the conduit and a rotating circular collector, and finally control conduits connecting the collector to the actuator, said control conduits crossing a planet carrier of the epicycloidal gear train.

These aspects of the invention, as well as other aspects, will now be described in more detail by means of the following figures.

Figure 1:
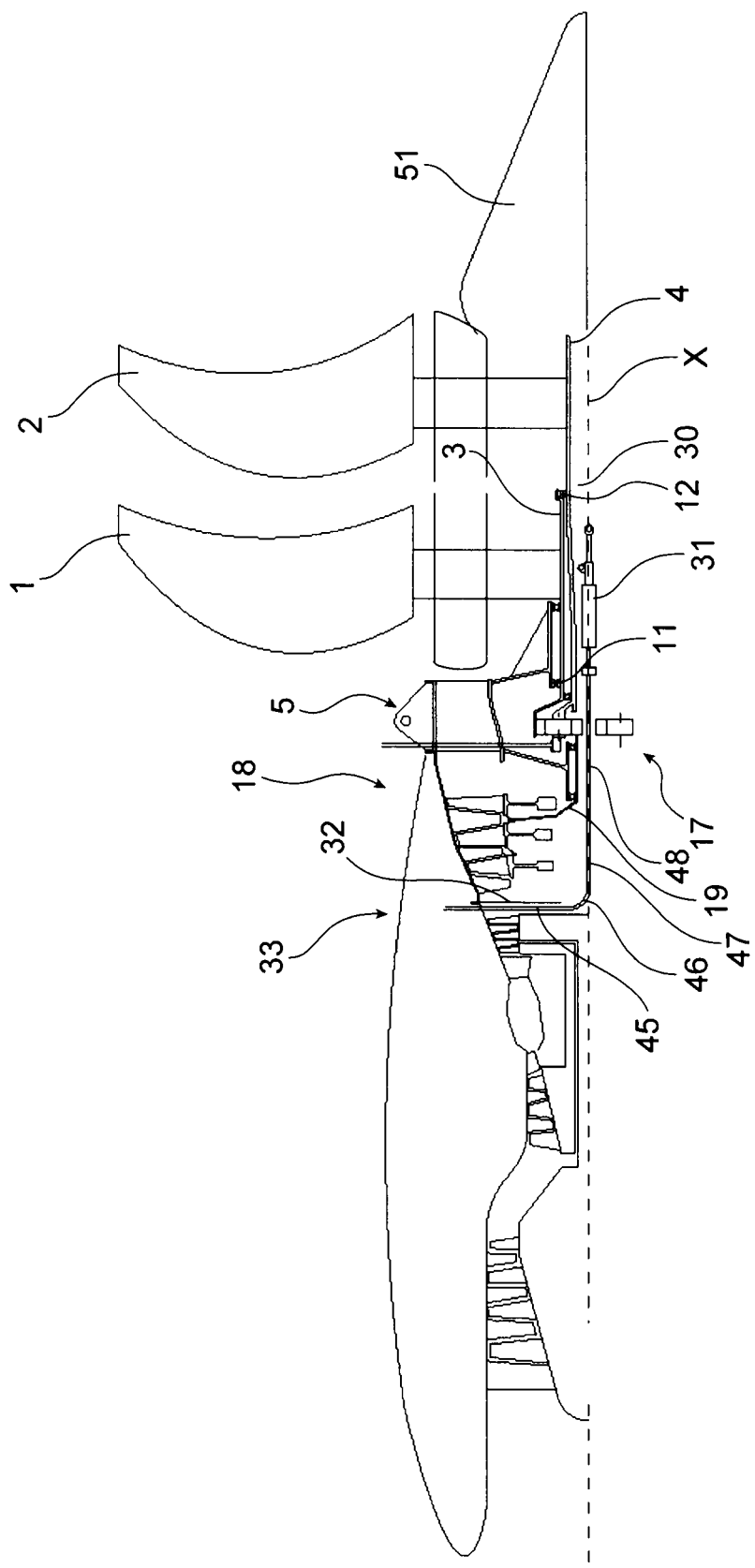
FIGS. 1 and 2 illustrate two views of the propeller device, without illustrating the invention, FIGS. 3 and 4 detail the characteristics of the invention.
Figure 2:
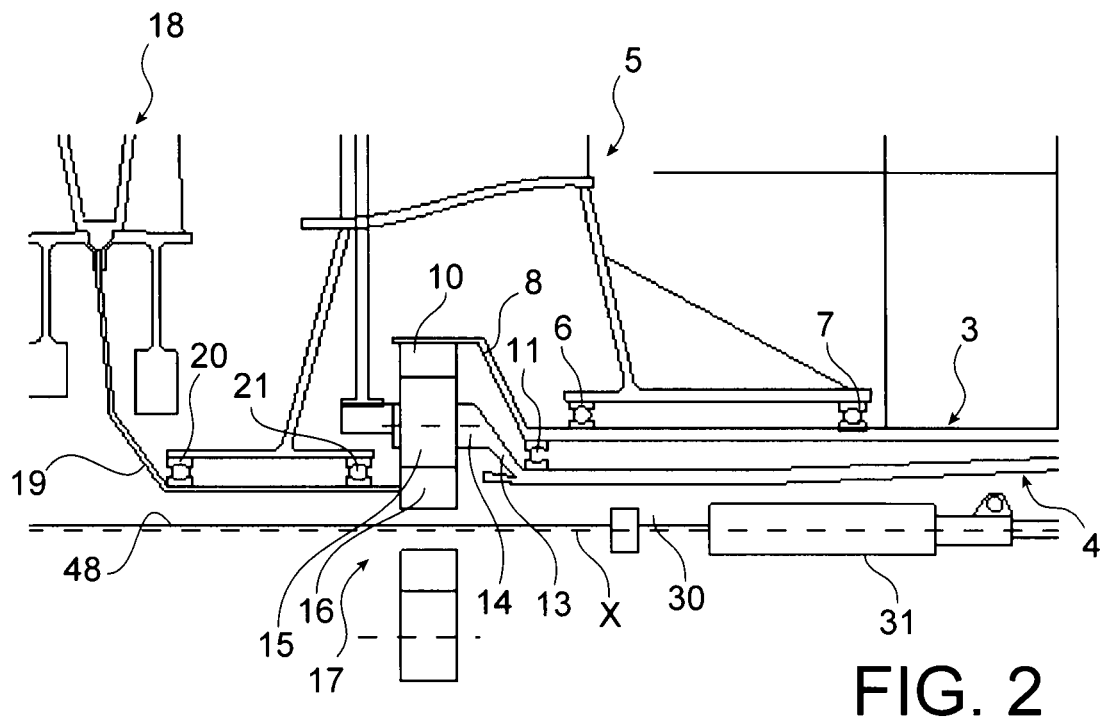
Figure 4:
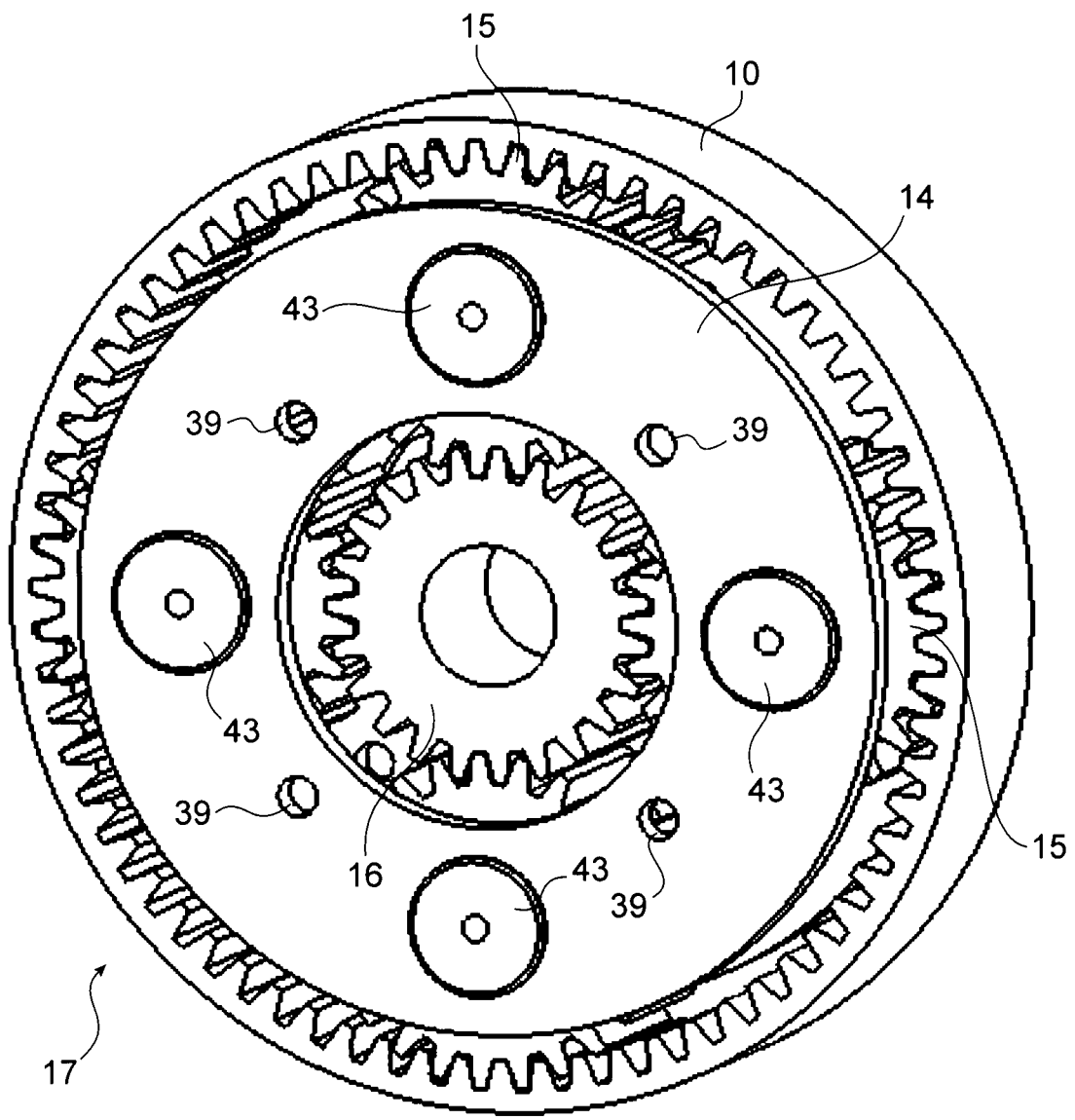
Figure 6:
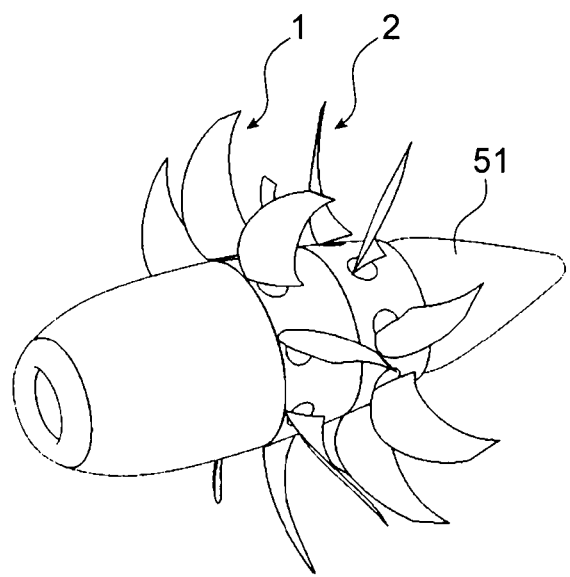
FIG. 6 is an isolated view of the hub bearing the propellers.

Reference is made to FIGS. 1 and 2. The engine which is part of the invention comprises two propellers 1 and 2 positioned in succession and rotating around a same axis X. The upstream propeller 1 is mounted on a first hollow shaft 3 and the downstream propeller 2 on a second hollow shaft 4. The first hollow shaft 3 is supported on a static case 5 by a pair of roller bearings 6 and 7 beyond which it opens into a conical sleeve 8 and ends up with an interiorly toothed crown 10. The second hollow shaft 4 is supported by the first hollow shaft 3 by means of two rolling bearings 11 and 12 and flores into a second conical sleeve 13, contained in the first conical sleeve 8 and which is connected to a planet carrier 14. The planet carrier 14 has planetary toothed wheels 15 distributed on a circle and which mesh exteriorly with the crown 10 and interiorally with a planetary wheel 16. The assembly forms an epicycloidal gear train 17 which is illustrated in FIG. 4. FIG. 6 illustrates the hub 51 bearing the propellers 1 and 2.

A low pressure turbine 18 is located on the other side of a static case 5. It comprises a third hollow shaft, which is a turbine shaft 19 which is used for having it supported by the static case 5 by means of two roller bearings 20 and 21. The turbine shaft 19 extends as far as the planetary wheel 16 which it supports.

The second hollow shaft 4 encloses a cavity 30 through which passes the axis X of the device. This cavity 30 contains an actuator 31 for modifying the pitch of the propellers 1 and 2. This for example is a hydraulic actuator supplied with oil; this may be another type of actuator (an electric motor for example), powered by another means providing it with the energy required for its operation (for example: electric energy). The actuator 31 is here a double actuator so as to separately control the pitches of the propellers 1 and 2. Actuators of this kind are known, as well as the transmissions required for providing their power not only to the second propeller 2, firmly secured to the second hollow shaft 4 which also drives the actuator 31 into rotation, but to the first propeller 1 which rotates in the opposite direction, and will not be further described. The cavity 30 extends not only into the hollow shafts 3 and 4, but through the epicycloidal gear train 17 and the turbine shaft 19, which supports the planetary wheel 16. It is a natural thing, and this has already been contemplated, to have the lines powering the actuator pass through the cavity 30 axially. They would then comprise an essentially radial power line 45 crossing an arm 30 of a stator 33 between both portions of the turbine 18, and comprising a bend 46, and then beyond a dynamic joint 47, a control line 48 leading to the actuator 31 and of axis X. The dynamic joint 47 is not mandatorily located at the indicated location, it may be located closer to the actuator 31. As this has been mentioned, this design has the drawback of exposing the oil to significant heating in the arm 32.

Figure 3:
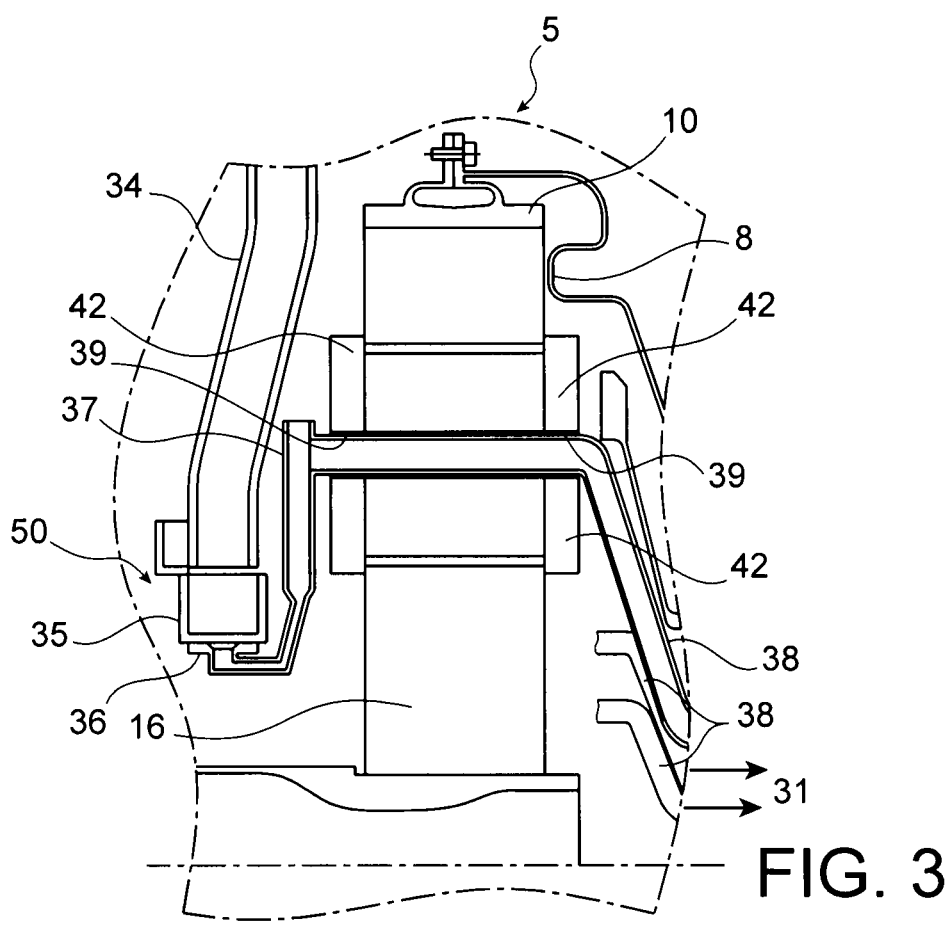

FIG. 3 illustrates the different and proposed design like the invention, according to which the power line 34 passes through the static case 5 by extending in the radial direction. It is interrupted close to the epicycloidal gear train 17 at an open end 35 which opens out into a circular collector 36 with a trough section of a dynamic joint 50 which further comprises a flange 37 bearing against the planet carrier 14. The collector 36 is therefore attached to the planet carrier 14 and rotates with it. The oil discharged through the supply conduit 34 dwells in the collector 36 before the pressure of the oil causes it to penetrate into the flange 37 which is hollow, with a double wall. Control lines 38 extend between the hollow of the flange 37 and the actuator 31 by passing through the planet carrier 14 and gather together upon arriving at the second conical sleeve 13 before joining the cavity 30. They may be four in number, two for each of the propellers 1 and 2, and one for the outflow and the backflow of the oil.

Figure 5:
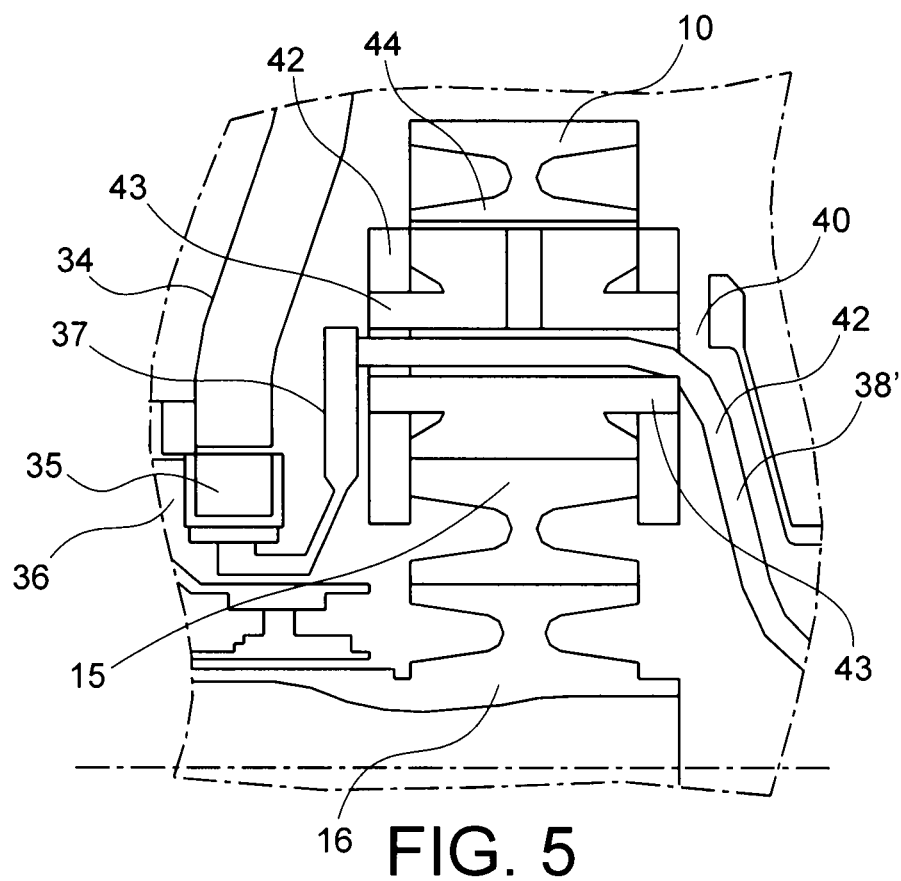
FIG. 5 illustrates an alternative embodiment.

The control lines 38 pass through drill holes 39 and 40 which are established either in the rings 42 forming the framework of the planet carrier 14, between the planets 15, or through the axis 43 for supporting the planets 15 by bearings 44. The first design is illustrated in FIGS. 3 and 4. The other design is illustrated in FIG. 5, where it is seen that the control lines, now referenced by 38', occupy a portion of the section of the drill holes 40 while allowing partial oil flow to reach the bearings 44. The drill holes 39 may of course then be omitted.

A hydraulic actuator 31 supplied with oil was described. Although the invention is then particularly advantageous, it is not limited to these actuators but may be applied for example to electric actuators 31 placed in the same location, hydraulic lines forming the conduits being replaced with electric power conduits illustrated by rigid sheaths of electric cables and the dynamic joint 50 with a suitable dynamic joint, for example with a brush, the collector then being a circular conducting track on which rubs the brush terminating the cable established through the case. The general arrangement of the system would not be changed.

The invention claimed is:

1. A device with counter-rotating propellers, comprising:
   means for changing a pitch of the propellers; and
   an epicycloidal gear train transmission, between a driving turbine and the propellers;
   the pitch changing means comprising an actuator supplied with energy and housed in a cavity surrounded by concentric shafts connecting the epicycloidal gear train to the propellers, and a system to transport energy of a stator to the actuator;
   wherein the transport system comprises a supply conduit passing through a static case of the stator, the static case extending between the turbine and the epicycloidal gear train, and then a dynamic joint between one end of the supply conduit and a rotating circular collector, and finally control conduits connecting the collector to the actuator, the control conduits passing through a planet carrier of the epicycloidal gear train.

2. The device according to claim 1, wherein the energy is electricity and the actuator is electric, the dynamic joint then being an electric joint.

3. The device according to claim 1, wherein the transport system further comprises lubrication conduits extending from the circular collector to bearings supporting toothed planetary wheels on the planet carrier.

4. The device according to claim 1, wherein bearings of the planets comprise drill holes through an axis established on the planet carrier, and the control conduits extend through the drill holes.

5. The device according to claim 1, wherein the control conduits cross a ring forming a framework of the planet carrier.

* * * * *